April 11, 1961

J. I. GREENBERGER 2,978,805

METHOD OF AND APPARATUS FOR HANDLING
AND JOINING STRIP MATERIAL

Filed Nov. 14, 1955

INVENTOR.
JOSEPH I. GREENBERGER
BY
Joseph E. Dickinson
HIS ATTORNEY

April 11, 1961    J. I. GREENBERGER    2,978,805
METHOD OF AND APPARATUS FOR HANDLING
AND JOINING STRIP MATERIAL
Filed Nov. 14, 1955    3 Sheets-Sheet 2

INVENTOR.
JOSEPH I. GREENBERGER
BY
Joseph E. Dickinson
HIS ATTORNEY

United States Patent Office 2,978,805
Patented Apr. 11, 1961

2,978,805

METHOD OF AND APPARATUS FOR HANDLING AND JOINING STRIP MATERIAL

Joseph I. Greenberger, Pittsburgh, Pa., assignor to United Engineering and Foundry Company, Pittsburgh, Pa., a corporation of Pennsylvania Filed Nov. 14, 1955, Ser. No. 546,424

11 Claims. (Cl. 29—430)

This invention relates to a method of and apparatus for feeding strips of metallic material to a strip end trimming and joining means and particularly relates to a novel method and apparatus for automatically feeding the leading end of a succeeding coil of strip for joining to the trailing end of a coil previously fed into and through the apparatus.

In the processing of metallic strip material such as would occur in continuous heat treating or plating line operations, the nature of the process being carried out, as well as the economic factors to be considered, require that the strip be fed in a continuous manner. This necessitates that the trailing ends of coils be joined together to the leading ends of coils which follow in order that continuous strip be provided and for best results that the operation be carried out as one of the steps in the processing line rather than as a separate operation carried out independently of the line.

In order that the processing line may be operated continuously and at a uniform speed, it is of utmost importance that the ends of the coils be prepared and the ultimate joining together thereof be accomplished in as short a time as possible. By employing apparatus of the type heretofore used for the purpose, it has been the experience that the processing operations which take place beyond the strip joining station are accomplished rather quickly on the available strip so that very little time will remain for the workman to position and join the leading end of a new strip to the trailing end of the previous one, thus resulting either in defective welds or in a slowing down of the speed of the line should more time be required for the operation than conditions permit.

It is, therefore, an object of this invention to provide a method and apparatus for preparing and automatically feeding the leading end of a succeeding coil of strip material to apparatus for joining to the trailing end of a coil previously fed into and through the apparatus.

It is another object of this invention to provide a method for automatically feeding strip to apparatus of a relatively simple construction within which the strip ends are to be joined together most efficiently and with a minimum of time required for the operation.

It is another object of this invention to provide an apparatus which is fully automatic, requiring no manual assistance from an operator for positioning and feeding the strip ends into the apparatus and for joining them together.

It is a still further object of this invention to provide an apparatus in the form of two opposed movable tables arranged to alternately feed into the strip and joining station the leading ends of successive coils of strip material.

These objects, as well as the various other novel features and advantages of this invention, will be apparent from the following description and accompanying drawings of which:

Figure 1:
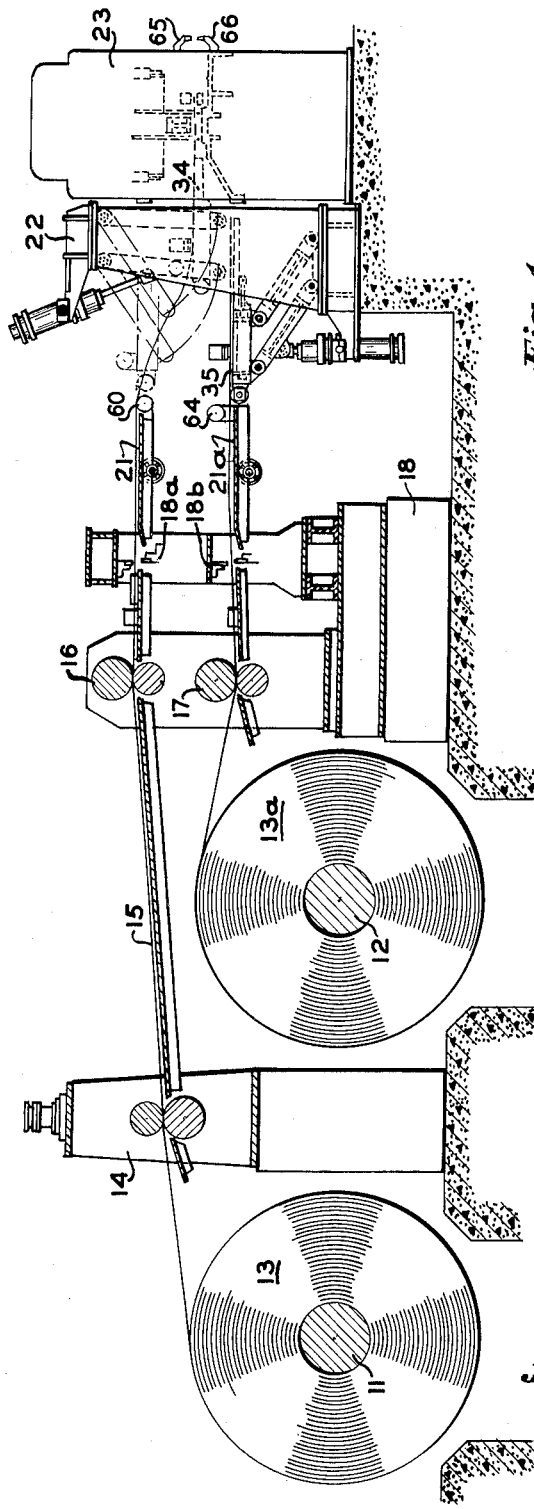
Fig. 1 is a partial sectional elevational view of an entry end of a typical processing line including the novel feeding apparatus as disclosed herein.

With reference to the drawings, and particularly to Fig. 1, there is shown diagrammatically therein the entry end of a typical processing line such as, for example, a high production continuous heat treating line of the type employed in the steel industry for annealing coils of strip material in a continuous manner. Included in the illustrated embodiment there are two spaced automatically axially adjustable payoff reels 11 and 12, the details of which are not shown specifically herein since reels of this type are well known in the art, upon which coils 13 and 13a respectively have been placed for threading through the strip joining mechanism and the apparatus which follows. The leading end of the coil 13 is fed to a pinch roll unit 14 arranged between the two reels and serves to advance the strip in conjunction with a conveyor 15 mounted above the second reel 12 to a second pair of pinch rolls 16. The reel 12, being spaced from the reel 11 and closely adjacent to the second pair of pinch rolls 16, serves to feed the leading end of the coil 13a, to a third pair of pinch rolls 17 mounted upon the same frame which supports the upper pinch rolls 16. Adjacent to the delivery side of the pairs of pinch rolls 16 and 17 there is a frame 18 within which there are supported a pair of upper snip shear blades 18a and a lower pair of blades 18b, one of each pair of which is stationary and the other reciprocably operable relative thereto for cutting strip material placed therebetween. From the pinch rolls 16 and 17 the strips advance over spaced strip side registers 21 and 21a each having a suitable side adjusting screw with handwheels affixed thereto, and from there to a feeder mechanism designated generally by the numeral 22 and arranged adjacent to a welder 23 within which the leading end of one strip is to be joined to the trailing end of a strip previously fed into and through the welder.

Figures 2, 3:
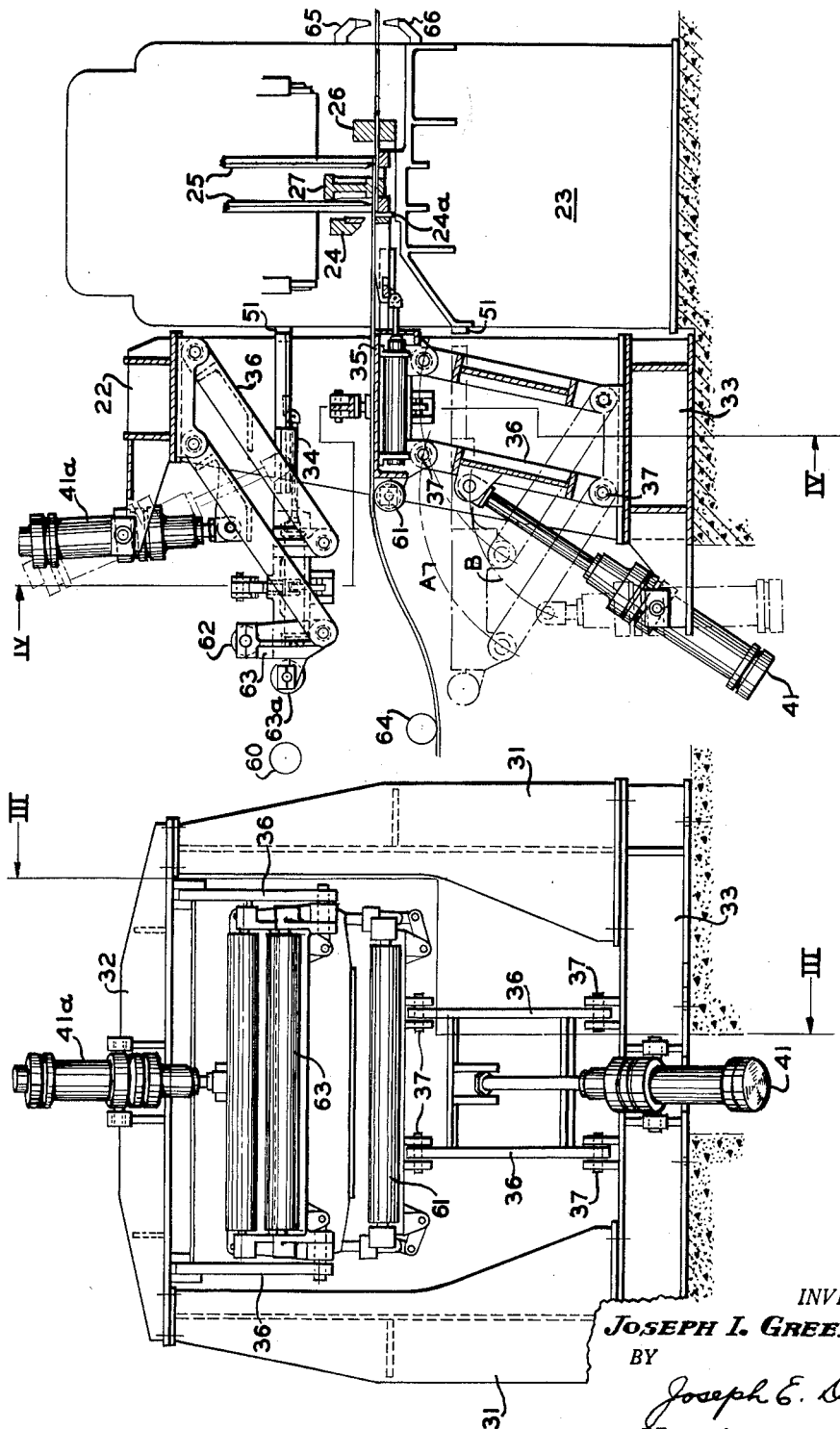
Fig. 2 is an elevational end view of the herein disclosed feeding apparatus.
Fig. 3 is a sectional elevational view taken on line III—III of Fig. 2.

As best shown in Fig. 3, the welder 23 includes a shear having upper and lower blades 24 and 24a, a pair of rotatable electrodes 25 adapted to traverse the strips at their overlapped portions for joining them together. The shear blades 24 and 24a, the electrodes 25 and the clamps 26 and 27 constitute the welding zone which will be referred to hereinafter. Beyond the strip end welding zone, and not shown specifically herein, there is the apparatus to which the continuous strip is fed for processing in a continuous fashion.

With reference to Figs. 2 and 3, the strip feeding apparatus 22 in the embodiment illustrated comprises a pair of vertical side frames 31 connected together at the top by a cross member 32 and at the bottom by a base 33. Pivotally mounted upon the cross member and base 32 and 33 respectively there are vertically spaced tables 34 and 35 pivotally secured by similar links 36 and pins 37 to the cross member 32 and to the base 33 respectively. For moving the upper and lower tables either into or out of the welding zone, individual piston-cylinder assemblies 41 and 41a respectively are provided and are secured to their respective tables and to the upper cross member 32 and base 33.

Figure 6:
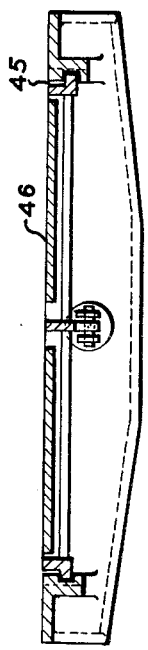
Fig. 6 is a sectional view taken on line VI—VI of Fig. 5.
Figure 5:
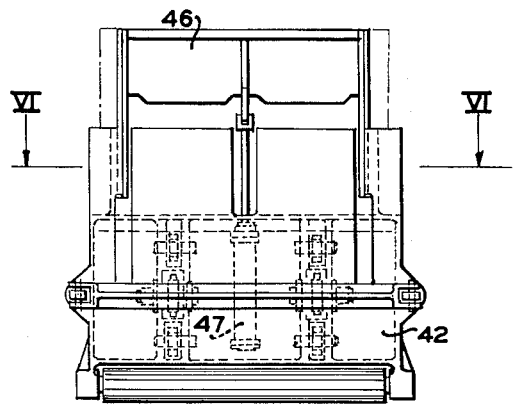
Fig. 5 is a plan view taken at line V—V of Fig. 4.
Figure 4:
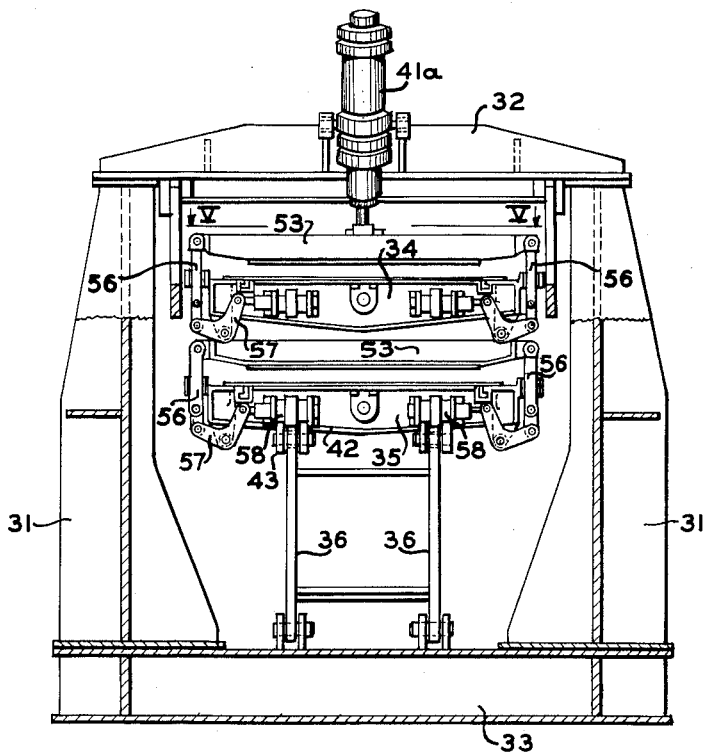
Fig. 4 is a sectional view taken on line IV—IV of Fig. 3.

As shown in Figs. 4, 5 and 6, both of the tables 34 and 35 are made up of similar frames 42 having brackets 43 to which the links 36 are pivotally secured. One end of each of the frames is provided with guiding surfaces 45 as best shown on Fig. 6 within which guides 45a are slidably received and which are secured to telescoping extensions 46 adapted to be received in collapsed or telescopic position beneath the tables. Piston-cylinder assemblies 47 are centrally mounted in each of the frames 42 with the piston rods thereof connected to the extensions 46. For normally urging the extensions to their extended positions, fluid under a constant pressure is introduced to the cylinder at the end opposite to the end in which the piston rod slides. The tables are also provided with clamping means which, as shown in Fig. 4, comprise a cross bar 53 which extends across the top horizontal surface of each of the tables 34 and 35. To the cross bars 53 and at their opposite ends there are secured vertical pins 54 which pass through each of openings 56 in the table frames 42. To the opposite end of the pins 54 there is secured one of the arms of one of the bell cranks 57 and the remaining arms of the bell cranks are in turn connected to piston-cylinder assemblies 58 which are actuated for engaging and disengaging the clamps with a strip placed upon the tables 34 and 35.

By reason of the arrangement of the elements comprising this invention, upon actuation of the cylinders 41 and 41a the movement of the tables 34 and 35 is as best shown by the arcuate dotted lines A and B in Fig. 3, in traversing the path both of the tables being restricted to move at least during some portion of their travel above the feeding line of the welder. During the movement of the bottom table 35, the end thereof will make contact with the welder lower shear knife 24a when the upper ends of the arms 36 reach the high points of the arcs A and B, as shown, thereby placing the leading end of the strip over the tailing end of the strip previously uncoiled and fed through the welder. As the table continues in its movement forward toward the welder, the end of the telescoping extension of the table comes to rest at a point slightly below the upper edge of the knife 24a. In the case of the top table 34, by virtue of the fact that the table is above the trailing end of the strip previously fed into the welder, as the table moves forward toward the welder the leading end of the strip will simply be placed upon the trailing end of the strip previously fed into the welder.

On the bottom table 35, there is a roller 61 so positioned that its upper surface is slightly above the top surface of the frame 42 for engaging the bottom of strip as it passes thereover. The roller 61 serves not only to assist in transferring the strip to the table but serves as a deflector roll when the table is in its feeding position as shown in Fig. 3. Ahead of the upper table there is a fixed roller 60, mounted in a suitable frame, not shown, and the arrangement of the upper table 34 is somewhat different from the bottom table 35. For the upper table there is a roller 62 which is mounted in an end bracket 63 above the surface of the upper table frame and so positioned as to engage with the top surface of the strip advanced thereunder. A second roll 63a is also mounted at the end of the top table 34 at a lower elevation than roller 62 and serves to support the strip from beneath when the strip is delivered to the upper table. A fixed roller 64 is mounted upon a suitable frame adjacent to and ahead of the roller 61 and serves as a deflector roll, just as does the roll 60 adjacent the upper table, to prevent the strip from bending too abruptly during the feeding and uncoiling of the coil 13a.

As shown in Fig. 3, there are two stops 51 which are mounted on the welder frame and engage with the forward ends of the tables 34 and 35 for preventing the leading end of the strips from moving beyond the table during the time the strip is fed forward by the pinch rolls 16 and 17.

At the delivery side of the welder 23 and secured to the frame thereof there is a strip side registering indicator consisting of two elements 65 and 66, above and below the strip respectively, which may be in the form of air jets, photocells or the like, operatively connected into the control system of the reels 11 and 12 for automatically adjusting the reels, with the strip being uncoiled therefrom, in an axial direction to maintain the strip edge along the path desired.

The operation of the present invention may be briefly summarized as follows: With reference to Fig. 1, it will be observed that the leading end of a coil 13, rotatably supported by the reel 11, has been introduced into the pinch roll units 14 and 16, the leading end sheared by snip shear 17a, fed to the upper table 34 and clamped thereto after which the table 34 is brought forward to deposit the leading end above the trailing end of the strip previously fed into the apparatus and then the two ends are welded together. After the welding is performed and the clamps 26 and 27 released, the clamps 52 are then released to permit the feeding of the joined strips through the welder and into the processing line. As the coil 13 is fed into the apparatus, the leading end of the next coil 13a is introduced into the lower set of pinch rolls 17, the end squared in the snip shear 17a and then fed to the lower centering guides 21.

From the shear, the strip is then fed through the guides 21 to the bottom table 35, now in its lower position as shown in Fig. 1, so that the strip will pass between the table and its clamp 52 and come into engagement with the stop 51. The clamp 52 is then brought downward against the strip to secure the strip to the table so that the strip is in readiness for feeding to the welder 23 when the uncoiling of the strip from coil 13 has been completed. The trailing end of coil 13 is interrupted momentarily in order to position it in the welding zone and there it is clamped and sheared. After shearing of the strip has been completed, the bottom piston-cylinder assembly 41 is actuated to bring the table 34 into its feeding position. The table, as it moves forward, will swing about an arc as determined by the lower links 36, the upper ends of which traverse arcs A and B. For a portion of its swing, the table is raised to an elevation slightly higher than the welder so as to place the strip over the trailing end of the strip previously fed into the apparatus. The positioning of the strip end is accomplished by virtue of the fact that when the collapsible extension 46 engages with the bottom shear knife at the welder, the force transmitted by the cylinder 41 is sufficient to overcome the force of the cylinder 47, which maintains the table extension in its outward position, so that as the extension is telescoped under the table with which it is associated the strip end will be exposed and unsupported from beneath. Once this has been accomplished the welding clamps 27 are brought into engagement with the overlapping strip ends and the electrodes are brought into welding position to perform the weld. After the weld has been made, the clamps 26 and 27 and the table clamp 54 are withdrawn and the joined strip is advanced into the processing line. The strip of the coil 13a, as it is fed to the processing unit, will engage with the rollers 64 thereby preventing the strip from being subjected to too great a bend.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. In combination with a means for joining together the leading end of one strip to the trailing end of another strip of material, strip feeding and positioning apparatus comprising a pair of strip end supporting means arranged normally one above and one below a pass line and at the entry side of a zone containing said joining means, means engageable with and for advancing said strip ends onto said supporting means, independent means for moving either of said supporting means in a horizontal and vertical direction with a strip leading end supported thereon from a position remote from and to a position adjacent to said zone for positioning the leading end of the strip carried thereby adjacent to the trailing end of a strip previously fed into and through said joining means, and means for clamping the strip ends together within said zone when the strip ends are to be joined together.

2. In combination with means for joining together the leading end of one strip to the trailing end of another strip of material, strip feeding and positioning apparatus comprising a pair of strip supporting means pivotally arranged normally one above and one below a pass line and at the entry side of a zone containing said joining means, means engageable with and for advancing said strip ends onto said supporting means, means for moving either of said supporting means in a horizontal and vertical direction with a strip leading end carried thereby from a position remote from to a position adjacent to said zone, a stop positioned adjacent to said zone and adapted to engage with said supporting means as they are independently brought into their strip feeding positions thereby to place the leading end of the strip adjacent to the trailing end of a strip previously fed into and through the joining means, and means for clamping said strip ends together within said zone prior to joining the ends of the strips together.

3. In combination with a means for joining together the leading end of one strip to the trailing end of another strip of material, strip feeding and positioning apparatus comprising a pair of strip end supporting means pivotally arranged normally one above and one below a strip pass line and at the entry side of a zone containing said joining means, means engageable with and for advancing said strip ends onto said supporting means, independent means for moving either of said supporting means in a horizontal and vertical direction from a position remote from to a position adjacent to said zone and along said pass line, a retractable section secured to and normally extending beyond each of said supporting means and upon which the strip leading end rests, means for urging said sections to their extended positions, a stop positioned adjacent to said zone adapted to engage with said slidable sections as said supporting means are independently brought into their strip feeding positions thereby to cause said sections to be withdrawn from their extended positions to expose the end of and position said strip end over the trailing end of a strip previously fed into and through the joining means.

4. The combination with means for joining together the leading end of one strip to the trailing end of another strip of material, strip feeding and positioning apparatus according to claim 1 in which clamping means are operatively arranged with respect to said supports for clamping the ends of a strip thereto.

5. The combination with means for joining together the leading end of one strip to the trailing end of another strip of material, strip feeding and positioning apparatus according to claim 1 in which stop means are provided and adapted to engage with said strip end supporting means thereby to cause said strip end supported thereon to be extended beyond said means for placing upon the trailing end of the strip previously fed through the apparatus for joining thereto.

6. The combination with means for joining together the leading end of one strip to the trailing end of another strip of material, strip feeding and positioning apparatus according to claim 1 in which a plurality of uncoilers are provided for supporting coils thereon to be alternately uncoiled and the leading end thereof entered into said zone for joining to the trailing end of a strip previously entered into and passed through said zone.

7. The method of feeding to and positioning the ends of strip material in a zone for joining the leading end of one strip to the trailing end of another in which feeding means are employed including a pair of tables adapted to be brought from a position remote from said zone to a position adjacent thereto comprising advancing the leading end of one strip to one of said tables, moving said table in a horizontal and vertical direction into a position to feed said strip material carried thereby through said zone and interrupting the trailing end of said strip in said zone while maintaining said strip trailing end in a horizontal plane, advancing the leading end of a second strip to said other table, retracting said first table from its advanced position to the remote position thereof while permitting the strip trailing end to remain within said zone and in substantially the same horizontal plane, moving said other table in a horizontal and vertical direction into a position adjacent to said zone for placing said strip leading end upon and for joining to the trailing end of the first-mentioned strip, clamping said strip ends together to prevent relative movement therebetween, retracting said other table to the remote position thereof and joining the strip ends together.

8. The method of feeding to and positioning the leading end of a strip in a strip end joining zone for connecting to the trailing end of a strip previously fed into and through said zone in which feeding means are employed including a pair of tables comprising advancing the leading end of a strip to one of said tables, moving said table in a horizontal and vertical direction into a position adjacent to said zone to place said leading end portion of said strip in position for joining to the trailing end portion of a strip previously fed into said zone and maintained in a substantially horizontal plane, joining said ends together and feeding the thus joined strip through said joining means, advancing the leading end of a subsequent strip to said other table, interrupting movement of the trailing end of said joined strips within said zone and retracting said first-mentioned table to a position remote from the advanced position thereof while maintaining said strip in a substantially horizontal plane, bringing forward said other table with the strip leading end carried thereby and placing the strip leading end adjacent to the trailing end of said previously advanced strip and joining said strip ends together.

9. The method of feeding to and positioning the leading end of a strip in a strip end joining zone for connecting the trailing end of a strip previously fed into and through said zone according to claim 8 in which said strip ends in their adjacent positions are clamped together prior to their being joined to one another.

10. The method of feeding to and positioning the leading end of a strip in a strip end joining zone for connecting the trailing end of a strip previously fed into and through said zone according to claim 8 in which said strip ends are clamped in an area adjacent to that in which the strips are to be joined.

11. In combination with means for joining together the leading end of one strip to the trailing end of another strip of material, strip feeding and positioning apparatus comprising a frame, a pair of vertically spaced tables of which one is above and the other below the pass line of the strip, links pivotally securing said upper table to the upper portion of said frame, additional links pivotally securing said lower table to the lower portion of said frame, means secured to and for moving each of said tables alternately into positions substantially coincident with said pass line and remote therefrom, telescoping table sections secured to each of said tables and extendable from a position beneath to a position outward of said tables and in a direction toward said strip end joining means, yieldable means secured to and normally maintaining said table sections in their most extended positions and means engageable with said table sections on movement of said tables from their remote positions to positions substantially coincident with said pass line thereby to oppose said yieldable means and cause said sections to assume positions beneath the respective tables to which they are attached.

References Cited in the file of this patent

UNITED STATES PATENTS

| | | |
|---|---|---|
| 1,936,314 | Sykes | Nov. 21, 1933 |
| 2,035,682 | Wikle | Mar. 31, 1936 |
| 2,203,151 | Iversen | June 4, 1940 |
| 2,221,468 | Bollinger et al. | Nov. 12, 1940 |
| 2,369,830 | Johnson | Feb. 20, 1945 |
| 2,489,324 | Remark | Nov. 29, 1949 |
| 2,547,544 | Smith | Apr. 3, 1951 |
| 2,724,426 | Bell et al. | Nov. 22, 1955 |
| 2,782,488 | Anderson | Feb. 26, 1957 |
| 2,787,465 | DeLaMotte | Apr. 2, 1957 |